(12) United States Patent
Goff et al.

(10) Patent No.: US 9,783,714 B2
(45) Date of Patent: Oct. 10, 2017

(54) CYANOACRYLATE COMPOSITIONS

(71) Applicant: Henkel Ireland Limited, Monheim (DE)

(72) Inventors: Ciara Goff, Dublin (IE); Marisa Phelan, Roscrea (IE); John Guthrie, County Kildare (IE); Cormac Duffy, County Louth (IE); Sabine Horn, Dublin (IE); Christina Despotopoulou, Dublin (IE)

(73) Assignee: Henkel IP & Holding GmbH, Duesseldorf (DE)

(*) Notice: Subject to any disclaimer, the term of this patent is extended or adjusted under 35 U.S.C. 154(b) by 53 days.

(21) Appl. No.: 13/838,303

(22) Filed: Mar. 15, 2013

(65) Prior Publication Data

US 2014/0262021 A1    Sep. 18, 2014

(51) Int. Cl.
- C09J 167/06    (2006.01)
- C09J 4/00    (2006.01)
- C08F 222/06    (2006.01)
- C08F 222/32    (2006.01)
- C08F 220/66    (2006.01)

(52) U.S. Cl.
CPC ............... *C09J 167/06* (2013.01); *C09J 4/00* (2013.01); *C08F 220/66* (2013.01); *C08F 222/06* (2013.01); *C08F 222/32* (2013.01)

(58) Field of Classification Search
CPC .......... C08F 22/00; C08F 22/32; C08F 22/30; C08F 222/00; C08F 222/06; C08F 222/32; C08F 220/66; C09J 4/00; C09J 167/06; A61B 5/1172
USPC ...................... 526/298; 522/79; 524/261, 112
See application file for complete search history.

(56) References Cited

U.S. PATENT DOCUMENTS

| | | | |
|---|---|---|---|
| 3,832,334 A | 8/1974 | O'Sullivan et al. | |
| 3,948,794 A * | 4/1976 | Konig | 526/271 |
| 4,196,270 A | 4/1980 | Chattha | |
| 4,450,265 A * | 5/1984 | Harris | 526/298 |
| 4,490,515 A | 12/1984 | Mariotti et al. | |
| 4,532,293 A | 7/1985 | Ikeda et al. | |
| 4,556,700 A | 12/1985 | Harris et al. | |
| 4,622,414 A | 11/1986 | McKervey | |
| 4,636,539 A | 1/1987 | Harris et al. | |
| 4,718,966 A | 1/1988 | Harris et al. | |
| 4,837,260 A * | 6/1989 | Sato et al. | 524/261 |
| 4,855,461 A | 8/1989 | Harris | |
| 4,906,317 A | 3/1990 | Liu | |
| 5,135,598 A * | 8/1992 | Kobe | C08J 7/18 156/273.3 |
| 5,312,864 A | 5/1994 | Wenz et al. | |
| 5,530,037 A * | 6/1996 | McDonnell et al. | 522/79 |
| 6,607,632 B1 | 8/2003 | McDonnell et al. | |
| 7,446,136 B2 * | 11/2008 | Rubinsztajn | 523/216 |
| 2009/0050019 A1* | 2/2009 | Kanou | C09J 4/00 106/287.2 |

FOREIGN PATENT DOCUMENTS

| | | |
|---|---|---|
| EP | 2511355 A1 | 10/2012 |
| WO | 8200829 A1 | 3/1982 |
| WO | 2013011421 A1 | 1/2013 |

OTHER PUBLICATIONS

Mikuni, Hiroyuki, Three Bond Technical News (vol. 2), Issue 34, Issued on Jun. 20, 1991, p. 1-2.*

G.H. Millet, "Cyanoacrylate Adhesives" in Structural Adhesives: Chemistry and Technology, S.R. Hartshorn, ed., Plenun Press, New York, p. 249-307 (1986).

H.V. Coover, D.W. Dreifus and J.T. O'Connor, "Cyanoacrylate Adhesives" in Handbook of Adhesives, 27, 463-77, I. Skeist, ed., Van Nostrand Reinhold, New York, 3rd ed. (1990).

International Search Report for International Application No. PCT/IB2014/000732 dated Sep. 30, 2014.

* cited by examiner

*Primary Examiner* — Angela C Scott
(74) *Attorney, Agent, or Firm* — Steven C. Bauman

(57) ABSTRACT

Allyl-cyanoacrylate-containing compositions with an anhydride aromatic component, which when cured confers improved moisture resistance, are provided.

16 Claims, 4 Drawing Sheets

CYANOACRYLATE COMPOSITIONS

BACKGROUND

Field

Allyl-cyanoacrylate-containing compositions with an anhydride aromatic component, which when cured confers improved moisture resistance, are provided.

Brief Description of Related Technology

Cyanoacrylate adhesive compositions are well known, and widely used as quick setting, instant adhesives with a wide variety of uses. See H. V. Coover, D. W. Dreifus and J. T. O'Connor, "Cyanoacrylate Adhesives" in *Handbook of Adhesives*, 27, 463-77, I. Skeist, ed., Van Nostrand Reinhold, New York, 3rd ed. (1990). See also G. H. Millet, "Cyanoacrylate Adhesives" in *Structural Adhesives Chemistry and Technology*, S. R. Hartshorn, ed., Plenun Press, New York, p. 249-307 (1986).

In the industrial marketplace, the moisture durability of cured cyanoacrylate adhesives could stand improvement. Indeed, the poor moisture durability is a feature for tissue adhesives based on cyanoacrylates (such as those sold under the INDERMIL tradename), as such tissue adhesives tend to sluff off after washing with warm water.

The lack of moisture durability is particularly apparent on metal substrates, which is a problem for industrial uses. Cured cyanoacrylate adhesives are susceptible to hydrolysis when exposed to moisture, resulting in a rapid reduction in the molecular weight of the cured cyanoacrylate. As a result, bond strength is compromised.

In the past, efforts have been made to improve the durability of cured cyanoacrylate compositions, with a particular focus on exposure to elevated temperatures.

For instance, U.S. Pat. No. 3,832,334 is directed to the addition of maleic anhydride, which is reported to produce cyanoacrylate adhesives having increased thermal resistance (when cured) while preserving fast cure speed.

U.S. Pat. No. 4,196,271 is directed to tri-, tetra- and higher carboxylic acids or their anhydrides, which are reported to be useful for improving heat resistance of cured cyanoacrylate adhesives.

U.S. Pat. No. 4,450,265 is directed to the use of phthalic anhydride to improve heat resistance of cyanoacrylate adhesives. More specifically, the '265 patent is directed to and claims an adhesive composition comprising a polymerizable constituent the major part of which comprises at least one ester of 2-cyanoacrylic acid, characterized in that the composition additionally comprises a proportion of phthalic anhydride effective for favorably influencing the strength and/or durability of adhesive bonds formed from the composition, under exposure to moisture or elevated temperature. The effective amount is reported as 0.1% to 5.0%, such as 0.3% to 0.7%, by weight of the composition. The '265 patent reports the superiority of phthalic anhydride over compositions where no additive was used, and where maleic anhydride was used (though less pronounced in the case of stainless steel lapshears than in those of aluminium).

U.S. Pat. No. 4,532,293 is directed to the use of benzephenonetetracarboxylic acid or its anhydride to provide superior heat resistance for cyanoacrylate adhesives.

U.S. Pat. No. 4,490,515 is directed to cyanoacrylate compositions containing certain maleimide or nadimide compounds to improve hot strength properties.

Allyl-cyanoacrylate is known to undergo a cross-linking reaction through the allyl functional groups, once given a post-bake (either as an additional process step or as a result of the environment in which they are used) after initial cure occurs. This provides improved thermal stability.

Despite these efforts, there has been a long standing, but unmet, desire to achieve more robust performance from cyanoacrylate compositions, particularly under elevated relative humidity conditions. It would accordingly be quite advantageous to provide a solution to that desire.

SUMMARY

The present invention provides that solution by describing a cyanoacrylate composition, which when cured confers improved moisture resistance. Broadly speaking, the cyanoacrylate composition includes (a) an allyl-cyanoacrylate and (b) an aromatic anhydride component.

This invention is also directed to a method of bonding together two substrates, which method includes applying to at least one of the substrates a composition as described above, and thereafter mating together the substrates, and to a method of improving the moisture resistance of cured cyanoacrylate compositions.

Also, the invention is directed to a method of preparing the inventive compositions.

In addition, the present invention is directed to reaction products of the inventive compositions.

The invention will be more fully understood by a reading of the section entitled "Detailed Description", which follows.

DETAILED DESCRIPTION

Figure 1:
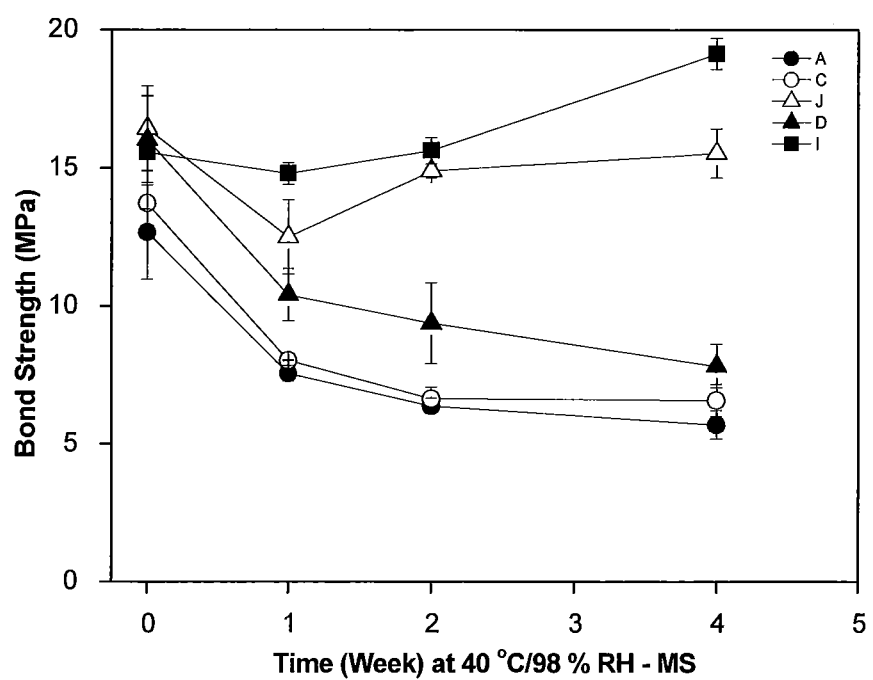
FIG. 1 shows bond strength on mild steel substrates (at a temperature of 40° C. and 98% relative humidity) of ethyl-2-cyanoacrylate with and without anhydride additives, and allyl-2-cyanoacrylate with anhydride additives.

As noted above, this invention is directed to a cyanoacrylate composition, which when cured confers improved moisture resistance. The cyanoacrylate composition includes (a) an allyl-cyanoacrylate and (b) an anhydride component.

The allyl-2-cyanoacrylate should be included in the compositions in an amount within the range of from about 50% to about 99.98% by weight, with the range of about 90% to about 99% by weight being desirable, and about 95% by weight of the total composition being particularly desirable.

Beyond the allyl-2-cyanoacrylate, the cyanoacrylate composition may also include other cyanoacrylate monomers, such as those represented by $H_2C=C(CN)-COOR$, where R is selected from $C_{1-15}$ alkyl, alkoxyalkyl, cycloalkyl, alkenyl, aralkyl, aryl, and haloalkyl groups. Desirably, the cyanoacrylate monomer is selected from methyl cyanoacrylate, ethyl-2-cyanoacrylate, propyl cyanoacrylates, butyl cyanoacrylates (such as n-butyl-2-cyanoacrylate), octyl cyanoacrylates, β-methoxyethyl cyanoacrylate and combinations thereof. Bis-cyanoacrylate may also be included.

The aromatic anhydride component may be any aromatic anhydride, though phthalic anhydride or 4,4'-(4,4'-isopropylidone diphenoxy)bis(phthalic anhydride), are desirable.

In addition to the aromatic anhydride component, hydrogenated or partially hydrogenated aromatic anhydrides may also be included. An example of a hydrogenated aromatic anhydride is a hydrogenated phthalic anhydride, such as 3,4,5,6-tetrahydrophthalic anhydride. Isomeric versions thereof and partially hydrogenated versions of phthalic anhydride may also be used.

The aromatic anhydride component should be used in an amount up to about 1% by weight, such as within the range of about 0.05 to about 0.5% by weight.

Accelerators may also be included in the inventive cyanoacrylate compositions, such as any one or more selected from calixarenes and oxacalixarenes, silacrowns, crown ethers, cyclodextrins, poly(ethyleneglycol) di(meth)acrylates, ethoxylated hydric compounds and combinations thereof.

Of the calixarenes and oxacalixarenes, many are known, and are reported in the patent literature. See e.g. U.S. Pat. Nos. 4,556,700, 4,622,414, 4,636,539, 4,695,615, 4,718,966, and 4,855,461, the disclosures of each of which are hereby expressly incorporated herein by reference.

For instance, as regards calixarenes, those within the following structure are useful herein:

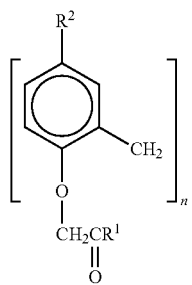

where $R^1$ is alkyl, alkoxy, substituted alkyl or substituted alkoxy; $R^2$ is H or alkyl; and n is 4, 6 or 8.

One particularly desirable calixarene is tetrabutyl tetra[2-ethoxy-2-oxoethoxy]calix-4-arene.

A host of crown ethers are known. For instance, examples which may be used herein either individually or in combination, include 15-crown-5, 18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphtyl-16-crown-5, 1,2-methyl-benzo-18-crown-6, 1,2-methylbenzo-5, 6-methylbenzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6 and 1,2-benzo-1,4-benzo-5-oxygen-20-crown-7. See U.S. Pat. No. 4,837,260 (Sato), the disclosure of which is hereby expressly incorporated herein by reference.

Of the silacrowns, again many are known, and are reported in the literature.

Specific examples of silacrown compounds useful in the inventive compositions include:

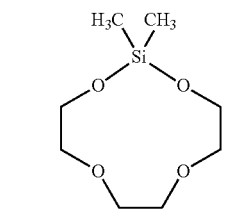

dimethylsila-11-crown-4;

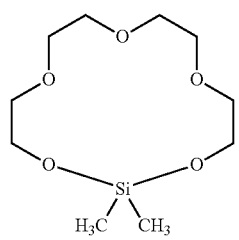 [SMILES: C[Si]1(C)OCCOCCOCCOCCO1]

dimethylsila-14-crown-5;

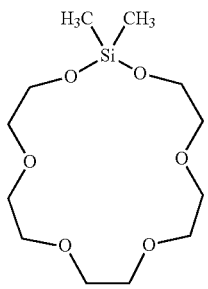 [SMILES: C[Si]1(C)OCCOCCOCCOCCOCCO1]

and dimethylsila-17-crown-6.

See e.g. U.S. Pat. No. 4,906,317 (Liu), the disclosure of which is hereby expressly incorporated herein by reference.

Many cyclodextrins may be used in connection with the present invention. For instance, those described and claimed in U.S. Pat. No. 5,312,864 (Wenz), the disclosure of which is hereby expressly incorporated herein by reference, as hydroxyl group derivatives of an α, β or γ-cyclodextrin would be appropriate choices as an accelerator component.

For instance, poly(ethylene glycol) di(meth)acrylates suitable for use herein include those within the following structure:

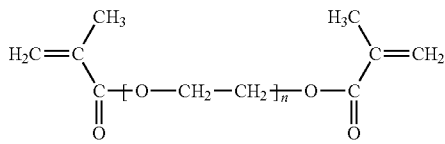

where n is greater than 3, such as within the range of 3 to 12, with n being 9 as particularly desirable. More specific examples include PEG 200 DMA, (where n is about 4) PEG 400 DMA (where n is about 9), PEG 600 DMA (where n is about 14), and PEG 800 DMA (where n is about 19), where the number (e.g., 400) represents the average molecular weight of the glycol portion of the molecule, excluding the two methacrylate groups, expressed as grams/mole (i.e., 400 g/mol). A particularly desirable PEG DMA is PEG 400 DMA.

And of the ethoxylated hydric compounds (or ethoxylated fatty alcohols that may be employed), appropriate ones may be chosen from those within the following structure:

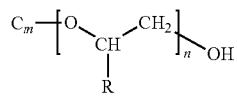

where $C_m$ can be a linear or branched alkyl or alkenyl chain, m is an integer between 1 to 30, such as from 5 to 20, n is an integer between 2 to 30, such as from 5 to 15, and R may be H or alkyl, such as $C_{1-6}$ alkyl.

When used, the accelerator embraced by the above structures should be included in the compositions in an amount within the range of from about 0.01% to about 10% by weight, with the range of about 0.1 to about 0.5% by weight being desirable, and about 0.4% by weight of the total composition being particularly desirable.

A stabilizer package is also ordinarily found in cyanoacrylate compositions. The stabilizer package may include one or more free radical stabilizers and anionic stabilizers, each of the identity and amount of which are well known to those of ordinary skill in the art. See e.g. U.S. Pat. Nos. 5,530,037 and 6,607,632, the disclosures of each of which are hereby incorporated herein by reference.

Other additives may be included in the inventive cyanoacrylate compositions, such as certain acidic materials (like citric acid), thixotropy or gelling agents, rubber tougheners, thickeners, dyes, and combinations thereof.

In another aspect of the invention, there is provided a method of bonding together two substrates, which method includes applying to at least one of the substrates a composition as described above, and thereafter mating together the substrates for a time sufficient to permit the adhesive to fixture. For many applications, the substrate should become fixed by the inventive compositions in less than about 150 seconds, and depending on the substrate as little as about 30 seconds.

In yet another aspect of the invention, there are provided cured reactive products of the so-described compositions.

In still another aspect of the invention, there is provided a method of preparing the so-described compositions.

The invention will be further illustrated by the examples which follow.

EXAMPLES

All samples were prepared by mixing together the noted constituents for a sufficient period of time to ensure substantial homogeneity of the constituents. Ordinarily, about 30 minutes should suffice, depending of course on the quantity of the constituents used.

Initially, a variety of aromatic and hydrogenated anhydrides were evaluated in ethyl cyanoacrylate compositions, each containing 6.5 percent by weight of PMMA, 0.1 percent by weight of a crown ether, and 7 ppm of $BF_3$, to form Samples B-E (with Sample A without an anhydride used as a control). The formulation details are set forth below in Table 1.

TABLE 1

| Constituents | | Sample/(Amt/wt %) | | | |
|---|---|---|---|---|---|
| Type | Identity | A | B | C | D |
| CA | Ethyl CA | 92.82 | 92.73 | 92.32 | 92.55 |
| Anhydride | Phthalic Anhydride | — | 0.09 | 0.5 | 0.09 |
| | 4,4'-(4,4'-isopropylidone diphenoxy)bis (phthalic anhydride) | — | — | — | 0.09 |
| | 3,4,5,6-tetrahydro-phthalic anhydride | — | — | — | 0.09 |

A variety of aromatic and hydrogenated aromatic anhydrides were also evaluated in an allyl cyanoacrylate composition ("Allyl CA" or "ACA"), each containing 6.5 percent by weight of PMMA, 0.1 percent by weight of a crown ether, and 7 ppm of $BF_3$, to form Samples F-J. Sample E is used as a control. The formulation details are set forth in Table 2.

TABLE 2

| Constituents | | Sample/(Amt/wt %) | | | | | |
|---|---|---|---|---|---|---|---|
| Type | Identity | E | F | G | H | I | J |
| CA | Allyl CA | 93.40 | 93.40 | 93.40 | 93.40 | 93.40 | 93.40 |
| Anhydride | Phthalic Anhydride | — | 0.09 | | | 0.09 | 0.5 |
| | 4,4'-(4,4'-isopropylidone diphenoxy)bis (phthalic anhydride) | — | — | — | 0.09 | 0.09 | |
| | 3,4,5,6-tetra-hydro-phthalic anhydride | — | | 0.09 | — | 0.09 | |

Figure 2:
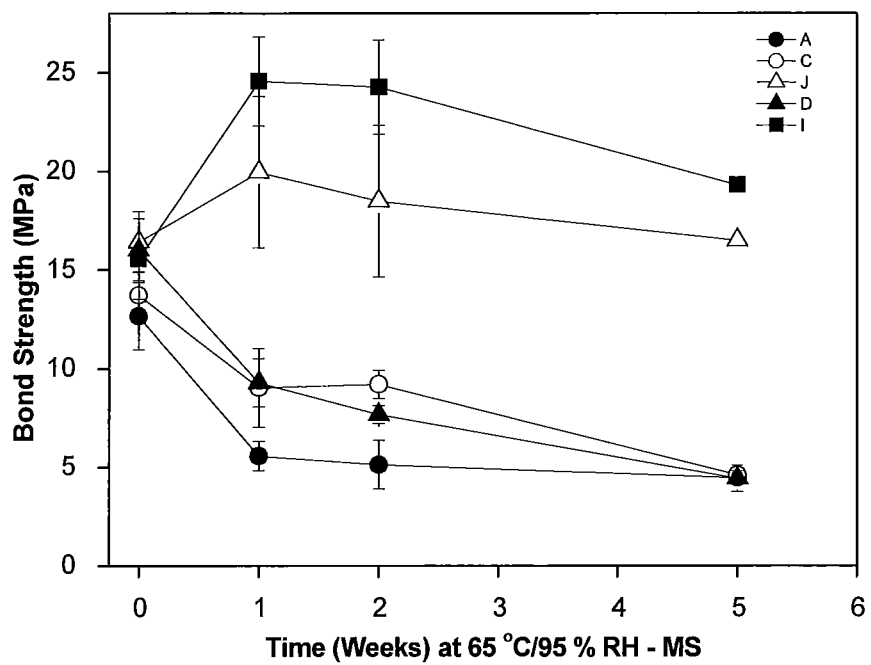
FIG. 2 shows bond strength on mild steel substrates (at a temperature of 65° C. and 95% relative humidity) of ethyl-2-cyanoacrylate with anhydride additives, and allyl-2-cyanoacrylate.
Figure 3:
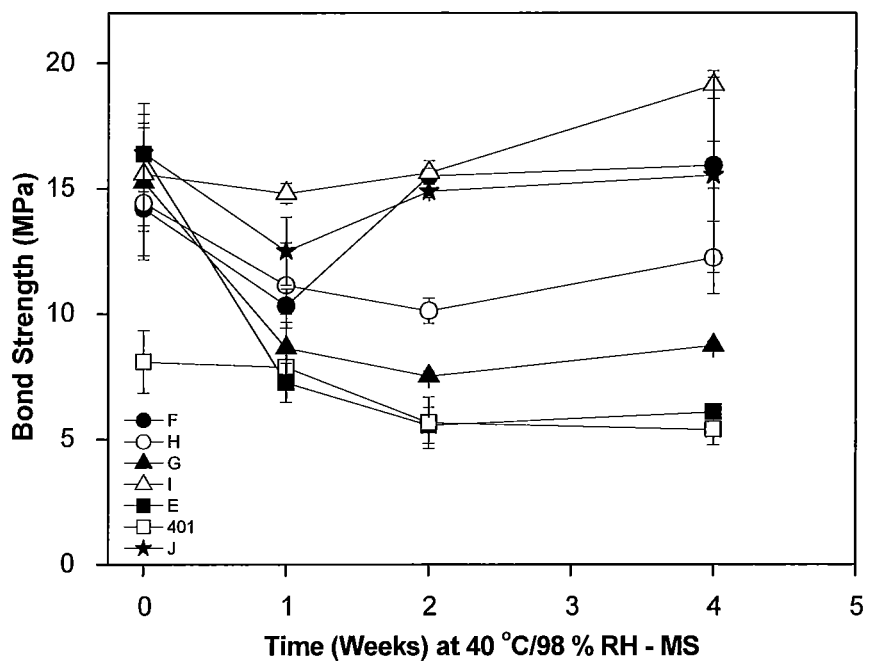
FIG. 3 shows bond strength over time (in weeks) under a temperature of 65° C. and 95% relative humidity of multiple cyanoacrylate compositions on mild steel substrates.

Tables 3-5 capture bond strength maintenance over time for mild steel lap shear assemblies at 98% or 95% relative humidity and a temperature of either 40° C. or 65° C. Reference to FIGS. 1-3 shows this data graphically.

Next, allyl cyanoacrylate and ethyl cyanoacrylate ("Ethyl CA" or "ECA") were used individually and in combination in increments of 10 parts, increasing or decreasing as shown in Table 6. PMMA at 6.5 parts, 0.1 percent by weight of a crown ether, 7 ppm of $BF_3$ and phthalic anhydride at 0.5 parts were also used in each of the samples.

Table 3 shows bond strength data generated over time on mild steel lap shear assemblies. With reference to FIG. 1, it is seen that the addition of 0.5% phthalic anhydride to the allyl cyanoacrylate composition (Sample J) significantly outperforms its counterpart ethyl cyanoacrylate composition (Sample C). Similar observations were made when comparing the addition of all three anhydrides to the allyl cyanoacrylate composition (Sample I) and the ethyl cyanoacrylate composition (Sample D). Table 4 shows bond strength data generated over time on mild steel substrates. With reference to FIG. 2, it is seen that the addition of all three anhydrides at levels of less than 0.09% to the allyl cyanoacrylate composition (Sample I) significantly outperform the counterpart ethyl cyanoacrylate composition (Sample D). Table 5 shows bond strength data generated over time on mild steel substrates. With reference for FIG. 3, it is seen that the addition of any of the anhydrides to the allyl cyanoacrylate compositions—Samples F, H, I and J—significantly outperform the counterpart ethyl cyanoacrylate compositions.

TABLE 3

| Sample | Time (weeks)/Mpas | | | |
|---|---|---|---|---|
| | 0 | 1 | 2 | 4 |
| A | 12.6 | 7.6 | 6.4 | 5.7 |
| C | 13.7 | 8.0 | 6.6 | 6.6 |
| J | 16.4 | 12.5 | 14.9 | 15.5 |
| D | 16.0 | 10.4 | 9.4 | 7.8 |
| I | 15.6 | 14.8 | 15.6 | 19.1 |

TABLE 4

| Sample | Time (weeks)/Mpas | | | |
|---|---|---|---|---|
| | 0 | 1 | 2 | 4 |
| A | 12.6 | 5.6 | 5.1 | 4.5 |
| C | 13.7 | 9.0 | 9.2 | 4.6 |
| J | 16.4 | 20.0 | 18.5 | 16.5 |
| D | 16.0 | 9.3 | 7.7 | 4.4 |
| I | 15.6 | 24.6 | 24.3 | 19.3 |

TABLE 5

| Sample | Time (weeks)/Mpas | | | |
|---|---|---|---|---|
| | 0 | 1 | 2 | 4 |
| F | 14.2 | 10.3 | 15.5 | 15.9 |
| H | 14.4 | 11.1 | 10.1 | 12.2 |
| G | 15.2 | 8.6 | 7.5 | 8.7 |
| I | 15.6 | 14.8 | 15.6 | 19.1 |
| E | 16.4 | 7.3 | 5.6 | 6.1 |
| LOCTITE 401 | 8.1 | 7.9 | 5.7 | 5.4 |
| J | 16.4 | 12.5 | 14.9 | 15.5 |

TABLE 6

| Sample No. | ACA | ECA |
|---|---|---|
| 1 | 0 | 100 |
| 2 | 0 | 100 |
| 3 | 10 | 90 |
| 4 | 20 | 80 |
| 5 | 30 | 70 |
| 6 | 40 | 60 |
| 7 | 50 | 50 |
| 8 | 60 | 40 |
| 9 | 70 | 30 |
| 10 | 80 | 20 |
| 11 | 90 | 10 |
| 12 | 100 | 0 |
| 13 | 100 | 0 |

Each of Sample Nos. 1-13 was applied to mild steel lap shears, and bonded assemblies prepared for moisture performance evaluation. Tables 7 and 8 capture bond strength maintenance over time for steel lap shear assemblies at 98% or 95% relative humidity and either 40° C. or 65° C. The data shown in Table 7 may be seen graphically with reference to FIG. 4; the data shown in Table 8 may be seen graphically with reference to FIG. 5.

TABLE 7

| Sample No. | Time (weeks)/Mpas | | | |
|---|---|---|---|---|
| | 0 | 1 | 2 | 4 |
| 1 | 12.7 | 7.6 | 6.4 | 5.7 |
| 2 | 13.7 | 8.0 | 6.6 | 6.6 |
| 3 | 15.4 | 8.1 | 9.8 | 8.2 |
| 4 | 15.2 | 9.5 | 10.1 | 8.8 |
| 5 | 17.8 | 9.7 | 11.7 | 9.1 |
| 6 | 18.2 | 11.6 | 14.3 | 10.2 |
| 7 | 18.2 | 12.3 | 19.4 | 13.2 |
| 8 | 16.9 | 13.0 | 19.9 | 13.7 |
| 9 | 18.5 | 14.9 | 21.6 | 16.1 |
| 10 | 16.3 | 15.2 | 21.7 | 21.9 |
| 11 | 17.9 | 16.5 | 24.6 | 20.1 |
| 12 | 16.4 | 19.5 | 16.6 | 17.3 |
| 13 | 16.4 | 7.3 | 5.6 | 6.1 |

TABLE 8

| Sample No. | Time (weeks)/Mpas | | | |
|---|---|---|---|---|
| | 0 | 1 | 2 | 4 |
| 1 | 12.7 | 5.6 | 5.1 | 4.5 |
| 2 | 13.7 | 9.0 | 9.2 | 4.61 |
| 3 | 15.4 | 12.0 | 8.6 | 6.5 |
| 4 | 15.2 | 13.5 | 9.7 | 6.6 |
| 5 | 17.8 | 13.9 | 9.7 | 8.8 |
| 6 | 18.2 | 17.4 | 9.9 | 8.5 |
| 7 | 18.2 | 21.5 | 13.8 | 9.9 |
| 8 | 16.9 | 21.8 | 12.9 | 14.1 |
| 9 | 18.5 | 23.4 | 16.5 | 17.3 |
| 10 | 16.3 | 22.5 | 18.9 | 17.6 |
| 11 | 17.9 | 26.3 | 18.7 | 20.8 |
| 12 | 16.4 | 23.6 | 21.7 | 20.0 |
| 13 | 16.4 | 8.3 | 7.1 | 8.0 |

Figure 4:
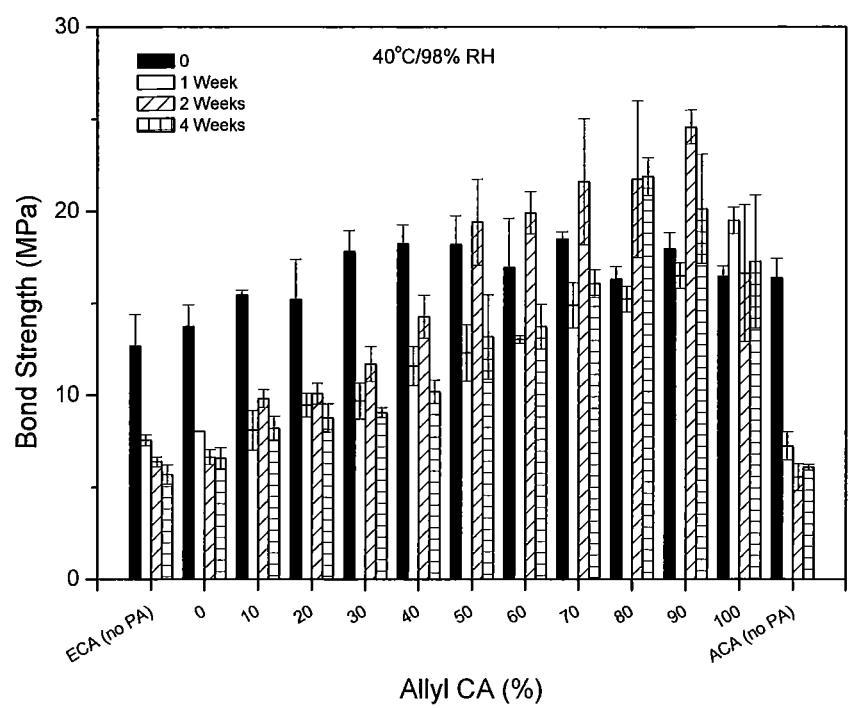
FIG. 4 shows bond strength over time (in weeks) under a temperature of 40° C. and 98% relative humidity of multiple cyanoacrylate compositions containing varying levels of allyl and ethyl cyanoacrylate on mild steel substrates.
Figure 5:
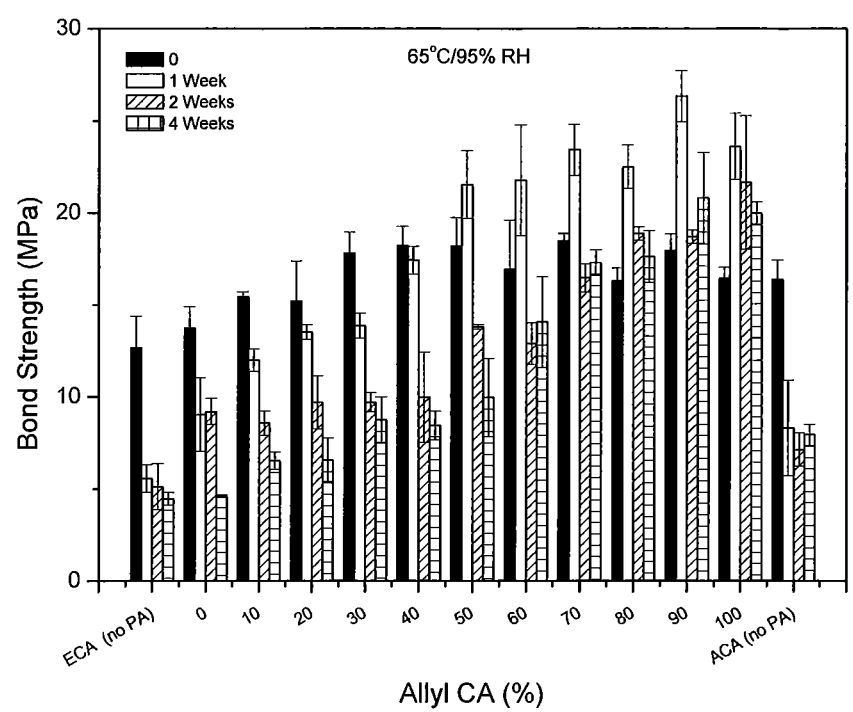
FIG. 5 shows bond strength over time (in weeks) under a temperature of 65° C. and 95% relative humidity of multiple cyanoacrylate compositions containing varying levels of allyl and ethyl cyanoacrylate on mild steel substrates.

With reference to FIGS. 4 and 5, it is seen that the allyl cyanoacrylate/anhydride compositions out perform the ethyl cyanoacrylate/anhydride compositions, particularly when one views data generated from compositions where the level of allyl cyanoacrylate is greater than or equal 40% by weight of the total composition.

What is claimed is:

1. A cyanoacrylate adhesive composition, comprising:
   (a) a cyanoacrylate component comprising allyl-2-cyanoacrylate and another cyanoacrylate monomer, and
   (b) in an amount up to about 1% by weight based on the total composition, an aromatic anhydride component selected from the group consisting of phthalic anhydride, 4,4'-(4,4'-isopropylidone diphenoxy)bis(phthalic anhydride), and combinations thereof,
   wherein said allyl-2-cyanoacrylate is present in an amount of at least 40% by weight, based on the cyanoacrylate component.

2. The composition of claim 1, further comprising an acidic stabilizer and a free radical inhibitor.

3. The composition according to claim 1, wherein the another cyanoacrylate monomer is (a) represented by $H_2C=C(CN)—COOR$, wherein R is selected from $C_{1-15}$ alkyl, alkoxyalkyl, cycloalkyl, alkenyl, aralkyl, aryl and haloalkyl groups, or (b) a biscyanoacrylate.

4. The composition according to claim 1, further comprising an accelerator component selected from the group consisting of calixarene, oxacalixarene, silacrown, cyclodextrin, crown ether, poly(ethyleneglycol) di(meth)acrylate, ethoxylated hydric compound, and combinations thereof.

5. The composition according to claim 4, wherein the crown ether is selected from members within the group consisting of 15-crown-5, 18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphtyl-16-crown-5, 1,2-methyl-benzo-18-crown-6, 1,2-methylbenzo-5, 6-methylbenzo-18-crown-6, 1,2-t-butyl-18-crown-6, 1,2-vinylbenzo-15-crown-5, 1,2-vinylbenzo-18-crown-6, 1,2-t-butyl-cyclonexyl-18-crown-6, asym-dibenzo-22-crown-6, and 1,2-benzo-1,4-benzo-5-oxygen-20-crown-7 and combinations thereof.

6. Reaction products of the composition according to claim 1.

7. The composition according to claim 1, wherein said allyl-2-cyanoacrylate is present in an amount of up to about 90% by weight of the cyanoacrylate component.

8. The composition according to claim 1, wherein cured products of which show improved moisture resistance at a temperature of 65° C. and 95% relative humidity.

9. A cyanoacrylate adhesive composition, comprising
    (a) a cyanoacrylate component comprising allyl-2-cyanoacrylate and another cyanoacrylate monomer,
    (b) an aromatic anhydride component selected from the group consisting of phthalic anhydride, 4,4'-(4,4'-isopropylidone diphenoxy)bis(phthalic anhydride), and combinations thereof, and
    (c) a hydrogenated aromatic anhydride component, wherein said allyl-2-cyanoacrylate is present in an amount of at least 50% by weight, based on the cyanoacrylate component.

10. The composition according to claim 9, wherein cured products of which show improved moisture resistance at a temperature of 65° C. and 95% relative humidity.

11. A cyanoacrylate adhesive composition, comprising:
    (a) a cyanoacrylate component comprising in an amount of at least 40% by weight, allyl-2-cyanoacrylate, and in an amount of at least 60% by weight, ethyl-2-cyanoacrylate, each based on the total cyanoacrylate component, and
    (b) in an amount of about 0.5% by weight, phthalic anhydride, based on the total composition.

12. The composition according to claim 11, wherein cured products of which show improved moisture resistance at a temperature of 65° C. and 95% relative humidity.

13. The composition according to claim 11, wherein said allyl-2-cyanoacrylate is present in an amount of at least 40% by weight to about 90% by weight.

14. A method of bonding together two substrates, comprising the steps of:
    applying a cyanoacrylate adhesive composition according to claim 1, to at least one of the substrates; and
    mating together the substrates for a time sufficient to permit the adhesive to fixture.

15. A method of preparing a cyanoacrylate adhesive composition according to claim 1, comprising the steps of:
    providing allyl-2-cyanoacrylate and another cyanoacrylate, and
    combining therewith with mixing an aromatic anhydride component.

16. A method of improving moisture resistance at a temperature of 65° C. and 95% relative humidity of cured cyanoacrylate compositions on assemblies having at least one substrate constructed from steel, comprising the steps of:
    applying a cyanoacrylate adhesive composition according to claim 1, to at least one of the substrates;
    mating together the substrates for a time sufficient to permit the cyanoacrylate adhesive composition to fixture and form assemblies; and
    exposing the assemblies to a temperature of 65° C. and 95% relative humidity.

* * * * *